(12) United States Patent
Nagano

(10) Patent No.: US 7,309,391 B2
(45) Date of Patent: *Dec. 18, 2007

US007309391B2

(54) ALUMINUM FLAKE PIGMENT COMPRISING ALUMINUM FLAKES AS BASIC PARTICLES, METHOD OF MANUFACTURING THE SAME, AND PAINT AND INK EMPLOYING THE SAME

(75) Inventor: Keita Nagano, Osaka (JP)

(73) Assignee: Toyo Aluminium Kabushiki Kaisha, Osaka-Shi (JP)

( * ) Notice: Subject to any disclaimer, the term of this patent is extended or adjusted under 35 U.S.C. 154(b) by 134 days.

This patent is subject to a terminal disclaimer.

(21) Appl. No.: 10/527,270

(22) PCT Filed: Feb. 16, 2004

(86) PCT No.: PCT/JP2004/001674

§ 371 (c)(1),
(2), (4) Date: Mar. 9, 2005

(87) PCT Pub. No.: WO2004/078854

PCT Pub. Date: Sep. 16, 2004

(65) Prior Publication Data

US 2006/0058419 A1    Mar. 16, 2006

(30) Foreign Application Priority Data

Mar. 5, 2003    (JP) ............................. 2003-058340

(51) Int. Cl.
*C09C 1/62*    (2006.01)
*C09B 67/50*    (2006.01)
*B02C 1/00*    (2006.01)
*B02C 23/06*    (2006.01)
*B24B 21/00*    (2006.01)
*B22F 1/00*    (2006.01)
*C22C 1/05*    (2006.01)

(52) U.S. Cl. .................. 106/403; 106/404; 106/412; 241/16; 241/21; 241/184; 451/330; 75/229; 75/255

(58) Field of Classification Search ............... 106/404, 106/412; 241/16, 21, 184; 451/330; 75/229, 75/255
See application file for complete search history.

(56) References Cited

U.S. PATENT DOCUMENTS

| | | | | |
|---|---|---|---|---|
| 3,244,542 A * | 4/1966 | Brown et al. | ............... | 106/277 |
| 3,776,473 A * | 12/1973 | Casey et al. | ................... | 241/15 |
| 4,049,610 A * | 9/1977 | Bunge et al. | .................. | 524/88 |
| 4,318,747 A * | 3/1982 | Ishijima et al. | ............. | 106/403 |
| 4,469,282 A * | 9/1984 | Booz | ........................... | 241/16 |
| 4,484,951 A * | 11/1984 | Uchimura et al. | .......... | 106/404 |
| 4,936,913 A * | 6/1990 | Hieda | ......................... | 106/404 |
| 5,531,930 A * | 7/1996 | Karton et al. | ............. | 252/363.5 |
| 5,800,607 A * | 9/1998 | Schnaitmann et al. | ...... | 106/412 |
| 6,464,769 B2 * | 10/2002 | Chattopadhyay et al. | ... | 106/403 |
| 2006/0014854 A1 * | 1/2006 | Minami | ...................... | 523/160 |

FOREIGN PATENT DOCUMENTS

| | | | |
|---|---|---|---|
| EP | 0 305 158 A1 | | 3/1989 |
| EP | 1 080 810 A1 | | 3/2001 |
| EP | 1 424 371 | * | 6/2004 |
| JP | 8-170034 A | | 7/1996 |
| JP | 11-152423 | * | 6/1999 |
| JP | 11-152423 A | | 6/1999 |
| JP | 2000-273350 A | | 10/2000 |
| JP | 2001-81359 A | | 3/2001 |
| JP | 2001-240808 A | | 9/2001 |
| JP | 2003-82258 A | | 3/2003 |
| JP | 2004-269559 | * | 9/2004 |
| WO | WO-99/54074 A1 | | 10/1999 |

* cited by examiner

*Primary Examiner*—J. A. Lorengo
*Assistant Examiner*—Patricia L. Hailey
(74) *Attorney, Agent, or Firm*—Birch, Stewart, Kolasch & Birch, LLP

(57) ABSTRACT

An aluminum flake pigment containing aluminum flakes as basic particles, said aluminum flakes having an average particle diameter in the range of 3 to 20 μm and an average value of minimum diameter/maximum diameter of at least 0.6.

8 Claims, No Drawings

ALUMINUM FLAKE PIGMENT COMPRISING ALUMINUM FLAKES AS BASIC PARTICLES, METHOD OF MANUFACTURING THE SAME, AND PAINT AND INK EMPLOYING THE SAME

TECHNICAL FIELD

The present invention relates to a novel aluminum flake pigment. More specifically, the present invention relates to an aluminum flake pigment excellent in designability having high brightness.

The present invention also relates to a method of manufacturing the novel aluminum flake pigment. Further, the present invention relates to a paint containing the novel aluminum flake pigment. In addition, the present invention relates to ink containing the novel aluminum flake pigment.

BACKGROUND TECHNIQUE

In general, aluminum flake pigments include leafing type and non-leafing type pigments. The leafing type aluminum flake pigment is obtained by employing a grinder such as a ball mill having spherical grinding media of steel such as steel balls and wet-grinding aluminum powder in an organic solvent such as mineral spirit or solvent naphtha with a grinding lubricant such as saturated fatty acid such as stearic acid. The non-leafing aluminum flake pigment is obtained by performing similar grinding with unsaturated fatty acid such as oleic acid as a grinding lubricant in place of the aforementioned saturated fatty acid or the like.

The leafing type aluminum flake pigment has weak affinity for a solvent or a binder contained in a paint due to small surface tension. Therefore, the leafing type aluminum flake pigment floats on the surface side of a coat and is substantially homogeneously oriented, thereby exhibiting excellent metallic effect and a base masking property.

On the other hand, the non-leafing type aluminum flake pigment has strong affinity for the solvent or the binder contained in the paint since the surface tension thereof is not so small. Therefore, the non-leafing type aluminum flake is distributed in a coat in a substantially homogeneously oriented state, thereby supplying the coat with metallic effect and exhibiting the so-called metallic design.

While the metallic effect of the coat is visually recognized in a combination of luminousness, brilliance, glitter etc., there is a strong tendency of desiring a coat having high luminance in general. In particular, an aluminum flake pigment having high luminousness has recently been highly required as a paint pigment for a talc can such as a beverage can. In general, the luminance of a coat and the average particle diameter of an aluminum flake pigment are so correlated that the luminance is increased as the average particle diameter is increased.

If the aluminum flake pigment has a large average particle diameter, however, the orientation of the aluminum flake pigment tends to be disturbed in formation of the coat, the aluminum flake pigment may project from the coat to result in blobbing on the surface of the coat, and the glitter of the coat may be too strong to result in unpreferable design.

Therefore, development of an aluminum flake pigment having a small average particle diameter as well as high luminance is desired and many efforts for development are made in various fields.

In relation to the leafing type aluminum flake pigment, various developments are made as those capable of forming a coat exhibiting high reflectance represented by electroplated chrome finishing, for example, and a paint having strong brightness employing a leafing type aluminum flake pigment of 0.1 to 1 µm in thickness and 1 to 60 µm in average particle diameter, for example, is disclosed (refer to Japanese Patent Laying-Open No. 2001-240808, for example).

A technique related to a paint employing a leafing type aluminum flake pigment having a small particle diameter is also disclosed (refer to Japanese Patent Laying-Open No. 2001-81359, for example). It is described that this paint has metallic effect with brightness substantially identical to that of an evaporated film and is preferable for a reflector of an automobile identification lamp such as a headlamp, a signal lamp or a tail lamp.

In relation to the non-leafing type aluminum flake pigment, it is disclosed that a metallic pigment composition containing (A) 100 parts by solid weight of coat forming resin and (B) 0.1 to 30 parts by weight of an aluminum flake pigment having an average particle diameter (D50) in the range of 20±5 µm, an average particle thickness (t) in the range of 0.5 to 1 µm and a gradient (n) of at least 2.7 in a Rosin-Rammler diagram can simultaneously supply a coat with strong luminousness and excellent appearance (refer to Japanese Patent Laying-Open No. 8-170034, for example).

Further, an aluminum flake pigment having high luminance and rich circulation resistance with an average thickness of 0.2 to 0.7 µm, an average particle diameter of 4 to 20 µm, an aspect ratio of 15 to 50 and a homogeneity factor (n)≧2.4 is disclosed (refer to Japanese Patent Laying-Open No. 11-152423, for example).

Also in paints employing these conventional leafing type aluminum flake pigments and non-leafing type aluminum flake pigments, however, the requirement for an aluminum flake pigment having a small average particle diameter as well as high luminance is not sufficiently satisfied.

DISCLOSURE OF THE INVENTION

On the basis of the aforementioned circumstances, the principle object of the present invention is to provide an aluminum flake pigment having a small average particle diameter as well as high brightness and luminance. Another object of the present invention is to provide a method of manufacturing an aluminum flake pigment having a small average particle diameter as well as high brightness and luminance.

Further, still another object of the present invention is to provide a paint exhibiting high brightness and luminance. A further object of the present invention is to provide ink exhibiting high brightness and luminance.

In order to attain the aforementioned objects, the inventor has detailedly studied the relation between the shape, the surface smoothness, the average particle diameter, the particle size distribution, the average thickness, the thickness distribution, the aspect ratio etc. of an aluminum flake pigment and the luminance of a coat containing this aluminum flake pigment.

In this process, the inventor has found that the luminance is reduced unless the average value of minimum diameters/maximum diameters of particle shapes of aluminum flakes is at least 0.6 even if employing an aluminum flake pigment having sharp particle size distribution by adjusting the average particle diameter or the aspect ratio of the aluminum flake pigment in a constant range or regulating the homogeneity factor (n) according to a Rosin-Rammler diagram on the basis of a well-known technique.

Therefore, the inventor has employed a leafing type aluminum flake pigment and/or a non-leafing type aluminum flake pigment having a specific shape on the basis of an unconventional new idea, to find that a coat obtained from a paint containing an aluminum flake pigment having this specific shape has high brightness and luminance.

The inventor has further found that aluminum powder having a specific average particle diameter may be ground and flaked in an organic solvent with a grinder comprising grinding media having a specific material, a specific shape and a specific diameter in order to obtain an aluminum flake pigment having this specific shape, to complete the present invention.

Namely, the inventive aluminum flake pigment is an aluminum flake pigment comprising aluminum flakes as basic particles, while these aluminum flakes have an average particle diameter in the range of 3 to 20 µm and an average value of minimum diameters/maximum diameters of at least 0.6.

The average aspect ratio of aluminum flakes, included in these aluminum flakes, having diameters of not more than 10 µm is preferably in the range of 8 to 20.

This aluminum flake pigment is preferably a leafing-type aluminum flake pigment, and the average value of fatty acid adsorption amounts on the surfaces of these aluminum flakes is preferably 0.0008 to 0.002 mole/cm$^2$.

The inventive method of manufacturing an aluminum flake pigment is a method of manufacturing the aforementioned aluminum flake pigment, and comprises a step of flaking aluminum powder in an organic solvent with a grinder comprising grinding media containing spherical media comprising a material including steel having diameters in the range of 0.3 mm to 1.5 mm.

The average particle diameter ($D50_{Al}$) of this aluminum powder is preferably in the range of 1.0 to 10.0 µm.

The inventive paint is a paint containing the aforementioned aluminum flake pigment and a binder.

The inventive ink is ink containing the aforementioned aluminum flake pigment and a binder.

BEST MODES FOR CARRYING OUT THE INVENTION

The present invention is now described in more detail with reference to an embodiment.

<Aluminum Flake Pigment>

The inventive aluminum flake pigment is an aluminum flake pigment having an average particle diameter and an average value of minimum diameters/maximum diameters in specific ranges.

Aluminum flakes forming basic particles of the inventive aluminum flake pigment are preferably aluminum flakes made of a pure aluminum metal since the average particle diameter, a water covering area, a leafing value etc. are simple to control. However, the inventive aluminum flake pigment may comprise aluminum flakes made of an alloy of aluminum and another metal as basic particles, or may comprise aluminum flakes slightly containing impurities as basic particles.

The average particle diameter of aluminum flake particles forming the basic particles of the inventive aluminum flake pigment is preferably in the range of 3 to 20 µm, more preferably in the range of 5 to 15 µm. The luminance of a coat tends to be insufficient if this average particle diameter is less than 3 µm, while glitter of the coat may be unpreferably excessively enhanced if this average particle diameter exceeds 20 µm.

The average value of minimum diameters/maximum diameters of the aluminum flake particles forming the basic particles of the inventive aluminum flake pigment must be at least 0.6, and is preferably at least 0.7. There is a tendency that no sufficient luminance is attained if this average value of minimum diameters/maximum diameters is less than 0.6. While the upper limit of this average value of minimum diameters/maximum diameters does not matter so far as the same is at least 0.6, the average value does not exceed 1 as a matter of course.

The minimum diameters of the aluminum flake particles are a concept different from the thicknesses of the aluminum flake particles. The minimum diameters of the aluminum flake particles are a concept indicating the minimum diameters of flat or curved potions of the aluminum flakes.

In the inventive aluminum flake pigment, the average aspect ratio of aluminum flake particles, included in the aluminum flake particles forming the basic particles of the aluminum flake pigment, having diameters of not more than 10 µm is preferably in the range of 8 to 20, more preferably in the range of 9 to 15. If this average aspect ratio is less than 8, fine particles are so insufficiently flaked that a coat tends to be turbid, reduced in luminance and inferior in design as a result. If this average aspect ratio exceeds 20, there is a tendency that the aluminum flake particles are bent or broken in circulation for preparing a paint and reduced in the so-called circulation resistance.

<Fatty Acid Adsorption Amounts>

If the inventive aluminum flake pigment is a leafing type aluminum flake pigment, the average value of fatty acid adsorption amounts on the surfaces of the aluminum flake particles forming the basic particles of the aluminum flake pigment is preferably in the range of 0.0008 to 0.002 mole/cm$^2$. If this average value of the fatty acid adsorption amounts is less than 0.0008, no stable leafing property is obtained but luminance tends to be reduced. If this average value of the fatty acid adsorption amounts exceeds 0.002, no sufficient leafing value is obtained but the luminance similarly tends to be reduced also in this case.

<Method of Manufacturing Aluminum Flake Pigment>

The inventive method of manufacturing an aluminum flake pigment is a method of manufacturing the aforementioned aluminum flake pigment, and comprises a step of flaking aluminum powder in an organic solvent with a grinder comprising grinding media.

<Shape and Diameter of Grinding Media>

As to the material for grinding media employed for the present invention, grinding media comprising a material containing steel such as stainless are preferable in consideration of the specific gravity and economy. Further, the grinding media employed for the present invention preferably contain spherical media having diameters in the range of 0.3 mm to 1.5 mm. However, these grinding media may not be true spherical media but may substantially be spherical media. These grinding media particularly preferably contain grinding media having diameters in the range of 0.5 to 1.0 mm.

The inventor has found that it is effective to reduce the diameters of the grinding media to the range of 0.3 mm to 1.5 mm in order to flakily grind fine aluminum powder not flaked in a general grinding process.

The inventor has also found that aluminum flake particles flaked with segmentation reduce the luminance due to necessarily notched outer peripheries of the particles. On the other hand, the inventor has also found that the outer peripheries of aluminum flake particles simply flaked with no segmentation of the particles are smoothly curved to satisfy essential conditions for aluminum flake particles exhibiting high luminance.

The term grinding generally means flaking regardless of segmentation of particles. However, it is assumed that the term grinding indicates a process of flaking aluminum powder substantially with no segmentation of particles in this specification.

If grinding media having diameters exceeding 1.5 mm occupy most part, fine aluminum powder is so trapped between the grinding media that this aluminum powder tends to be hard to grind and not efficiently flaked. For the ground aluminum powder, energy supplied from the grinding media to the aluminum powder by single contact is so excessively increased that the average value of minimum diameters/maximum diameters tends to be less than 0.7. If grinding media having diameters of less than 0.3 mm occupy most part, on the other hand, the weight of the grinding media is so excessively small that grinding force is inferior, an excessive grinding time is required and the aluminum powder tends to be substantially ungrindable.

As to these grinding media, at least two types of grinding media having different diameters may be mixed with each other. Further, grinding media having diameters exceeding 1.5 mm may be contained in a grinder employed for the present invention. In other words, it is important to flake aluminum powder with grinding media containing grinding media having diameters of 0.3 to 1.5 mm in the inventive manufacturing method. The quantity of the grinding media having diameters of 0.3 to 1.5 mm may be varied with the quantity of raw aluminum powder introduced into the grinder.

<Average Particle Diameter of Raw Aluminum Powder> The average particle diameter ($D50_{Al}$) of raw aluminum powder employed for the present invention is preferably in the range of 1.0 to 10.0 μm, more preferably in the range of 1.0 to 6.0 μm.

If this average particle diameter $D50_{Al}$ exceeds 10.0 μm, the diameters of the aluminum flakes forming the basic particles of the aluminum flake pigment after grinding are so increased that orientation of the aluminum flake pigment is disturbed in formation of a coat, the surface of the coat may be blobbed due to projection of the aluminum flake pigment or glitter of the coat may be so excessively strong that the design is unpreferable depending on the application. If this average particle diameter $D50_{Al}$ is less than 1.0 μm, on the other hand, the aluminum powder cannot be efficiently flaked despite the grinding media having diameters in the range of 0.3 to 1.5 mm but there is a tendency that no sufficient coat luminance is obtained.

<Ratio Between Average Particle Diameter of Raw Aluminum Powder and Diameter of Grinding Media>

In the inventive manufacturing method, the ratio ($D50_{Al}/D_B$) between the average particle diameter ($D50_{Al}$) of the raw aluminum powder and the diameters ($D_B$) of the grinding media is preferably in the range of 0.001 to 0.02, more preferably in the range of 0.0015 to 0.008. This is because the effect of flaking the fine aluminum powder is further increased due to the value of this ratio $D50_{Al}/D_B$ in the said range.

If the value of this ratio $D50_{Al}/D_B$ is less than 0.001, gaps between the grinding media are so excessively large as compared with the raw aluminum powder that the raw aluminum powder tends to be hardly efficiently flaked. If the value of the ratio $D50_{Al}/D_B$ exceeds 0.02, on the other hand, the grinding media are too small with respect to the raw material powder and hence the grinding force correlated with the mass of each grinding medium is so insufficient that the raw aluminum powder cannot be efficiently ground but there is a tendency that unflaked fine particles of aluminum remain to reduce the luminance of the coat.

<Ratio Between Mass of Raw Aluminum Powder and Volume of Organic Solvent>

In the inventive manufacturing method, the ratio ($W_{Al}/W_{sol}$) between the mass ($W_{Al}$ (kg)) of the raw aluminum powder and the volume ($W_{sol}$ (L)) of the organic solvent is preferably in the range of 0.1 to 0.3, more preferably in the range of 0.14 to 0.20. If the value of the ratio $W_{Al}/W_{sol}$ is less than 0.1, slurry viscosity in grinding is so reduced that there is a tendency that the raw aluminum powder swims and cannot be homogeneously ground. If the value of the ratio $W_{Al}/W_{sol}$ exceeds 0.3, on the other hand, the viscosity of slurry in grinding is so excessively increased that movement of the grinding media is suppressed and there is a tendency that the raw aluminum powder cannot be homogeneously flaked.

<Rotational Frequency In Case of Using Ball Mill as Grinder>

While the type of the grinder is not particularly restricted but a well-known grinder can be preferably used in the inventive manufacturing method, an attriter type grinder comprising a rotating arm therein, a cylindrical ball mill or the like can be preferably employed, for example. Among the said grinders, it is particularly preferable to employ the cylindrical ball mill in consideration of quality and productivity.

When employing a ball mill in the inventive manufacturing method, the rotational frequency of the ball mill is preferably set to not more than 95% of the critical rotational frequency. The term critical rotational frequency indicates such a rotational frequency that balls are centrifugally fixed to the inner wall of the ball mill if the rotational frequency exceeds this value, and is expressed in the following formula (1):

$$n=1/(2\pi)\times(g/r)^{1/2} \quad (1)$$

(In the formula (1), n represents the rotational frequency (rpm), g represents gravitational acceleration (3,528,000 cm/min$^2$) and r represents the radius (cm) of the ball mill.)

If the rotational frequency of the ball mill exceeds 95% of the critical rotational frequency, a pulverization effect is strengthened in the grinding effects and sufficient flaking cannot be attained but large flake particles are segmented to result in superfine particles, and hence the luminance of the coat tends to be reduced.

<Other Grinding Conditions>

In the inventive manufacturing method, grinding is preferably performed under presence of a grinding lubricant. While the grinding lubricant is not particularly restricted but a well-known one is usable, fatty acid such as oleic acid or stearic acid, fatty amine, fatty amide, fatty alcohol, an ester compound or the like is preferably usable.

The said grinding lubricant has an effect of suppressing unnecessary oxidation on the surface of the aluminum flake pigment and improving luster. The content of the grinding lubricant in grinding is preferably in the range of 0.1 to 20 parts by mass with respect to 100 parts by mass of the raw aluminum powder, more preferably in the range of 0.5 to 10 parts by mass. The aluminum flakes forming the basic particles of the aluminum flake pigment may so aggregate that there is an apprehension that surface gloss of the aluminum flake pigment is reduced if the content of the grinding lubricant is less than 0.1 parts by mass, while the physical properties of the paint may be reduced if the content of the grinding lubricant exceeds 20 parts by mass.

While higher saturated fatty acid such as stearic acid is used if the aluminum flake pigment is of a leafing type, temperature control in grinding is important. Adsorption of fatty acid on the surfaces of the aluminum flakes forming the basic particles of the aluminum flake pigment can be kept at 0.0008 to 0.0020 mole/cm$^2$ by keeping the in-mill temperature in grinding at 20 to 45° C. The adsorption tends to be increased if the grinding temperature is less than 20° C., while the adsorption tends to be reduced if the grinding temperature exceeds 45° C.

In the inventive manufacturing method, the ratio between the quantity of the raw aluminum powder and the quantity of the grinding media in grinding is preferably in the range of 20 to 200. Productivity tends to be reduced if the said ratio is less than 20, while the grinding time is extremely lengthened and the slurry viscosity may be so excessively increased during grinding that the raw aluminum powder cannot be efficiently ground if the said ratio exceeds 200.

While the organic solvent in grinding is not particularly restricted but a well-known one is usable in the inventive manufacturing method, a hydrocarbon solvent such as mineral spirit or solvent naphtha or an alcohol, ether or ester solvent is usable, for example. In general, a hydrocarbon solvent having a high boiling point is preferably used on consideration of a safety problem such as flammability to the solvent in grinding.

<Paint and Ink>

The inventive aluminum flake pigment can be blended into a paint, ink, a rubber composition, a plastic composition, an elastomer composition or the like for supplying this composition or the like with high luminance and brightness.

The inventive paint or ink contains the inventive aluminum flake pigment and a binder. The inventive paint or ink may contain the inventive aluminum flake pigment, a binder and a solvent. Further, the inventive paint may be powder paint.

The inventive aluminum flake pigment is preferably blended into the inventive paint or ink in the range of 0.1 to 30 mass %. Further, another coloring pigment, a dye or various additives can be added to the inventive paint or ink if necessary.

While the solvent employed for the inventive paint or ink is not particularly restricted but a well-known solvent can be used, aliphatic hydrocarbon such as mineral spirit, hexane, heptane, cyclohexane or octane, aromatic hydrocarbon such as benzene, toluene or xylene, halogenated hydrocarbon such as chlorobenzene, trichlorobenzene, perchloroethylene or trichloroethylene, alcohol such as methanol, ethanol, n-propyl alcohol or n-butanol, ketone such as n-propanone or 2-butanone, ester such as ethyl acetate or propyl acetate, ether such as tetrahydrofuran, diethyl ether, ethyl propyl ether, turpentine oil or the like can be listed. This solvent can be used as a simple substance, or at least two such solvents may be combined with each other.

While the above description applies to an organic solvent, the solvent used for the inventive paint or ink may be water. In this case, the inventive aluminum flake pigment is coated with a resin composition or a phosphoric compound and mixed with a binder and water to be usable as a water paint or ink.

While the binder employed for the inventive paint or ink is not particularly restricted but well-known coat forming resin or the like can be preferably employed, acrylic resin, polyester resin, alkyd resin or fluororesin can be listed, for example, and can also be used along with a cross-linking agent such as amino resin or block polyisocyanate resin. Further, lacquer hardened by natural drying, two-part polyurethane resin, silicone resin or the like can also be used. In the case of the binder employed for the inventive ink composition, oil such as linseed oil or castor oil, phenolic resin, natural resin such as rosin can be properly blended if necessary. This binder can be used as a simple substance, or at least two such binders can be mixed with each other.

While a coloring pigment addable to the inventive paint or ink is not particularly restricted but a well-known coloring pigment can be added to a degree not damaging the characteristics of the present invention, an organic pigment such as quinacridone red, phthalocyanine blue, phthalocyanine green, isoindolinone yellow, carbon black, perylene or azo lake, an inorganic pigment such as iron oxide, titanium oxide, cobalt blue, zinc white, ultramarine blue, chromium oxide, mica or chrome yellow or the like can be preferably used, for example. This coloring pigment is not restricted to one type but at least two types of coloring pigments may be mixed or simultaneously added.

Further, an ultraviolet absorber, a thickener, a static eliminator, a dispersant, an antioxidant, a lustering agent, a surface active agent, a synthetic preserver, a lubricant, a plasticizer, a hardener, a filler (toughening agent), wax or the like may be added to the inventive paint or ink if necessary.

<Method of Applying Paint and Method of Printing Ink>

As a method of applying the inventive paint, a well-known method can be employed and brushing, spraying, a doctor blade method, a roll coater method, a bar coater method or the like can be listed. As a method of performing printing with the inventive ink, intaglio printing such as gravure printing, flat bed printing such as offset printing (or also referred to as transfer printing), screen printing, letterpress printing or the like can be listed.

While a base material employed as the object to be coated with the inventive paint or ink is not particularly restricted but an article coatable with the paint or ink can be preferably employed, the body of an automobile, a motorcycle, a bicycle or another vehicle or a part thereof, an optical apparatus such as a camera or a video camera, an OA apparatus, sporting goods, a container for a cosmetic or a beverage can, a sound product such as a radio cassette recorder or a CD player, a household product such as a cleaner, a telephone set or a television or the like can be listed, for example.

While the material for the base material is not restricted either but a well-known one can be employed, an inorganic material such as ceramics, glass, cement or concrete, a plastic material such as natural resin or synthetic resin, metal, wood, paper or the like can be listed, for example. As a specific example of a substrate made of metal, a substrate made of iron, copper, aluminum, tin, zinc or the like, an alloy or a cast thereof or the like can be listed. The substrate made of such a metal is preferably previously chemically converted with phosphate, chromate or the like.

Further, the plastic material applicable to the material for the aforementioned substrate is not particularly restricted but a generally employed plastic composition can be preferably employed. For example, a substrate made of a plastic composition containing polyester resin, nylon resin, polyphenylene oxide resin, polyphenylene sulfide resin, polyetherether ketone resin, epoxy resin, ABS resin, acrylic resin, polycarbonate, polyolefic resin, ethylene-propylene copolymer, AES resin, AS resin, vinyl chloride resin, polystyrene resin, polyamide resin, PET, PBT, polyallylate, polyacetal, polyphenylene ether, polymethyl pentene, polyphenylene sulfide, polybutadiene, polyether sulfone or polysulfone, or a copolymer, a mixture or a denatured substance thereof can be listed. One or at least two of these can be employed.

When necessary due to the mode of the inventive paint, an undercoat, a coat and an overcoat or the like may be successively applied. In this case, a subsequent coat may be applied after applying and hardening each coat, or the subsequent coat may be applied after applying each coat by the so-called wet on wet coating and without hardening the same. In order to obtain a coat having excellent specular brightness, however, a metallic coat is preferably applied after applying and hardening an undercoat. The paint of each coat may be hardened by thermal hardening or cold setting, for example.

In this case, the thickness of the undercoat is not particularly restricted but preferably in the range of 10 to 200 μm in a general embodiment. Further, the thickness of the coat is not particularly restricted but preferably in the range of 1 to 100 μm in the general embodiment. The thickness of the overcoat is not particularly restricted but preferably in the range of 5 to 300 μm in the general embodiment.

While the present invention is now described in more detail with reference to Examples, the present invention is not restricted to these.

EXAMPLE 1

40 kg of steel balls of 0.7 mm in diameter serving as grinding media, 800 g of raw aluminum powder having an average particle diameter of 4.6 μm, 4 L of mineral spirit serving as an organic solvent and 80 g of oleic acid serving as a grinding lubricant were introduced into a cylindrical ball mill of 500 mm in diameter and 180 mm in length respectively, and ground at a rotational frequency of 41 rpm (68% of the critical rotational frequency) for 13 hours. The temperature during the grinding was kept at 20° C. to 40° C. with a water jacket.

After termination of the grinding step, slurry in the ball mill was washed out with the mineral spirit and successively passed through vibrating screens of 150 meshes, 350 meshes and 400 meshes so that the passed slurry was subjected to solid-liquid separation using the pan filter. Thereafter an obtained filter cake (non-volatile content: 85%) was transferred into a kneader mixer and kneaded for 1 hour for obtaining an aluminum flake pigment (non-volatile content: 80%).

EXAMPLES 2 TO 6 AND COMPARATIVE EXAMPLES 1 TO 3

The ball mill used in Example 1 was employed for grinding steps under various manufacturing conditions shown in Table 1. After termination of grinding, aluminum flake pigments (non-volatile contents: 80%) were obtained by methods similar to that for Example 1.

TABLE 1

| | Manufacturing Conditions | | | | | | | | | | |
|---|---|---|---|---|---|---|---|---|---|---|---|
| | Raw Aluminum Powder | | Mineral Spirit | | Quantity of Grinding Lubricant (g) | Rotational Frequency (rpm/% of the critical rotational frequency) | Grinding Time (Hour) | Grinding Temperature (° C.) | Quantity of Steel Balls (kg) | Diameter of Steel Balls $D_B$ (mm) | $D50_{Al}/D_B$ | $W_{Al}/W_{sol}$ |
| | $W_{Al}$(kg) | $D50_{Al}$ (μm) | $W_{sol}$ (liter) | Grinding Lubricant | | | | | | | | |
| Example 1 | 0.8 | 4.6 | 4.0 | Oleic Acid | 80 | 41/68 | 13 | 30 | 40 | 0.7 | 0.0066 | 0.200 |
| Example 2 | 1.0 | 3.5 | 5.0 | Stearic Acid | 190 | 35/80 | 10 | 30 | 50 | 1.2 | 0.0029 | 0.200 |
| Example 3 | 1.0 | 3.5 | 5.0 | Stearic Acid | 190 | 35/80 | 10 | 18 | 50 | 1.2 | 0.0029 | 0.200 |
| Example 4 | 1.0 | 1.7 | 4.2 | Stearic Acid | 190 | 35/80 | 12 | 35 | 50 | 1.2 | 0.0014 | 0.238 |
| Example 5 | 1.0 | 4.5 | 4.0 | Stearic Acid | 190 | 40/67 | 10.5 | 30 | 40 | 0.7 | 0.0064 | 0.250 |
| Example 6 | 1.0 | 4.5 | 4.0 | Stearic Acid | 190 | 50/83 | 16 | 30 | 40 | 0.5 | 0.0090 | 0.250 |
| Comparative Example 1 | 0.8 | 3.8 | 4.6 | Oleic Acid | 80 | 49/82 | 10 | 30 | 40 | 1.2 | 0.0032 | 0.174 |
| Comparative Example 2 | 3.0 | 10 | 2.0 | Stearic Acid | 115 | 29/88 | 8.0 | 35 | 50 | 6.4 | 0.0016 | 1.500 |
| Comparative Example 3 | 1.5 | 15 | 1.9 | Oleic Acid | 80 | 40/100 | 6.5 | 30 | 50 | 6.4 | 0.0023 | 0.789 |

<Preparation of Painted Plate>

5.0 g of each of the aluminum flake pigments (non-volatile contents: 80%) obtained in Examples 1 to 6 and comparative examples 1 to 3 was collected in a PP cup of 200 ml, allowed to stand for at least 30 minutes with addition of 5.0 g of toluene, and thereafter stirred with a glass rod until the same was completely dispersed. After the dispersion, 40.0 g of metallic paint varnish M6301-45 (alkyd resin by Dainippon Ink and Chemicals, Inc.) was added and dispersed with a homo disperser at 800 rpm for 10 minutes for preparing a paint.

The aforementioned paint containing each of the aluminum flake pigments obtained in Examples 1 to 6 and comparative examples 1 to 3 was applied onto a tin plate with a bar coater No. 10.

Thereafter the paint was dried at 140° C. for 10 minutes for obtaining a painted plate containing each of the aluminum flake pigments obtained in Examples 1 to 6 and comparative examples 1 to 3.

<Performance Evaluation>

The average particle diameter, the average value of minimum diameters/maximum diameters and the average aspect ratio of particles having diameters of not more than 10 μm were measured as to each of the aluminum flake pigments obtained in Examples 1 to 6 and comparative examples 1 to 3. As to leafing type aluminum flake pigments, the quantities of fatty acid adsorbed on the surfaces were measured. Further, a glass plate of 150 by 100 by 2 mm was spread on a painted surface of the aforementioned painted plate containing each aluminum flake pigment for measuring luminance (IV value) with Alcope LMR-200 (by Kansai Paint Co., Ltd.). Table 2 shows the results.

aspect ratios was defined as the average aspect ratio by setting the number of measurement to at least 50.

TABLE 2

| | Performance Evaluation | | | | |
|---|---|---|---|---|---|
| | Average Particle Diameter of Flake (μm) | Minimum Diameter/Maximum Diameter | Average Aspect Ratio of Particles of Not More Than 10 μm | Fatty Acid Adsorption Amounts (mol/cm$^2$) | IV Value of Film Luminance |
| Example 1 | 13.1 | 0.69 | 9.0 | 0.00045 | 183 |
| Example 2 | 12.4 | 0.78 | 10.4 | 0.00135 | 239 |
| Example 3 | 12.4 | 0.78 | 9.0 | 0.00290 | 180 |
| Example 4 | 6.9 | 0.72 | 7.5 | 0.00119 | 229 |
| Example 5 | 12.1 | 0.65 | 9.2 | 0.00121 | 243 |
| Example 6 | 11.9 | 0.62 | 9.8 | 0.00120 | 250 |
| Comparative Example 1 | 13.4 | 0.57 | 6.6 | 0.00037 | 143 |
| Comparative Example 2 | 14.6 | 0.52 | 5.2 | 0.00135 | 160 |
| Comparative Example 3 | 23.9 | 0.49 | 5.4 | 0.00054 | 103 |

As to the numerals in Table 2, the average particle diameters of raw aluminum powder and the aluminum flake pigments were measured with a laser diffraction particle size distribution measuring apparatus (Microtrack HRA by Honeywell) under the following conditions:

(i) Raw Aluminum Powder 0.5 g of raw aluminum powder was mixed with 0.01 g of hexametaphosphoric, acid, stirred with a glass rod, introduced into circulated water in a system of measurement, supersonically dispersed for 2 minutes and thereafter subjected to measurement.

(ii) Aluminum Flake Pigment 0.5 g of each aluminum flake pigment (non-volatile content: 80%) and 11.0 g of toluene were stirred with a glass rod, introduced into a circulated solvent (ethanol/IPA) in a system of measurement, supersonically dispersed for 30 seconds and thereafter subjected to measurement.

The average aspect ratio of aluminum flakes, included in the aluminum flake particles forming basic particles of each aluminum flake pigment, having diameters of not more than 10 μm was obtained by cutting the aforementioned painted plate into 1.5 cm square, smoothly polishing the surface of a sample embedded in epoxy resin so that the cut painted plate was perpendicular to the surface of the sample for preparing an observed sample and observing the states of the aluminum flakes in a section of a coat with a digital HD microscope VH-7000 (by KEYENCE). In other words, the thickness d and the major diameter D of each aluminum flake were measured with Image-Pro PLUS ver. 4 (by MEDIA CYBERNETICS) on a screen as to the observed aluminum flakes, At this time, the number of particles having major diameters D of not more than 10 μm was set to at least 50 and the aspect ratios (D/d) of all of at least 50 aluminum flakes as employed were calculated for regarding the average value thereof as the average aspect ratio of the aluminum flake, included in the aluminum flake particles forming the basic particles of each aluminum flake pigment, having diameters of not more than 10 μm.

While it cannot be necessarily said that major diameters D observed from sections express the major diameters of the individual aluminum flakes but the aspect ratios of the individual aluminum flakes calculated on the basis of these include slight errors, the average value of these individual aspect ratios was defined as the average aspect ratio by setting the number of measurement to at least 50.

The average value of minimum diameters/maximum diameters was defined by the average value of 50 particles by cleaning each aluminum flake pigment (non-volatile content: 80%) with acetone and powdering the same, thereafter observing the same with a scanning electron microscope (SEM S-2300 by Hitachi, Ltd.) and measuring the minimum diameter and the maximum diameter of a single aluminum flake with Image-Pro PLUS ver. 4 (by MEDIA CYBERNETICS) on a screen as to the observed aluminum flakes.

The quantity of fatty acid adsorbed on the surfaces of aluminum flakes was obtained by converting CO2 obtained by cleaning each aluminum flake pigment (non-volatile content: 80%) with acetone and powdering the same, thereafter baking the same in a closed heating cylinder (by ADVANTEC) at 350° C. and measuring the quantity of $CO_2$ generated by combustion of organic matter adsorbed to the surfaces of the aluminum flakes with INFRARED GAS ANALYZER URA-107 (by Shimadzu Corporation) with a measured stearic acid calibration curve and dividing the same by specific surface areas of the aluminum flakes.

The specific surface areas of the aluminum flakes were measured with a specific surface area measuring apparatus (BET method Flow Sorb II2300 by Shimadzu Corporation) after cleaning each aluminum flake pigment (non-volatile content: 80%) with acetone and powdering the same.

As shown in the above Table 2 of evaluation results, it is understood that coats employing the paints containing the aluminum flake pigment disclosed in the present invention are remarkably higher in luminance as compared with comparative examples.

INDUSTRIAL APPLICABILITY

From the aforementioned evaluation results, it can be said that the inventive aluminum flake pigment is an aluminum flake pigment having high luminance also when the average particle diameter is small, and an aluminum flake pigment remarkably excellent in designability. In other words, it can be said that the inventive aluminum flake pigment is an aluminum flake pigment having a small average particle diameter as well as high brightness and luminance.

According to the inventive method of manufacturing an aluminum flake pigment, fine aluminum powder can also be discoidally flaked by employing a grinder containing steel grinding media having diameters in the range of 0.3 mm to 1.5 mm. Therefore, the obtained aluminum flake pigment has a small average particle diameter as well as high brightness and luminance. In other words, the inventive method of manufacturing an aluminum flake pigment is a method of manufacturing an aluminum flake pigment having a small average particle diameter as well as high brightness and luminance.

Further, the inventive paint is a paint exhibiting high brightness and luminance. In addition, the inventive ink is ink exhibiting high brightness and luminance.

The invention claimed is:

1. An aluminum flake pigment comprising aluminum flakes as basic particles, wherein said aluminum flakes have an average particle diameter in the range of 3 to 20 μm and an average value of minimum diameters/maximum diameters of at least 0.6.

2. The aluminum flake pigment according to claim 1, wherein the average aspect ratio of aluminum flakes, included in said aluminum flakes, having diameters of not more than 10 μm is in the range of 8 to 20.

3. The aluminum flake pigment according to claim 1, wherein said aluminum flake pigment is a leafing type aluminum flake pigment, and the average value of fatty acid adsorption amounts on the surfaces of said aluminum flakes is 0.0008 to 0.002 mole/cm2.

4. A method of manufacturing the aluminum flake pigment of claim 1, which comprises the step of flaking aluminum powder in an organic solvent with a grinding spherical media made of a material including steel having diameters in the range of 0.3 mm to 1.5 mm.

5. The method of manufacturing the aluminum flake pigment according to claim 4, wherein the average particle diameter ($D50_{Al}$) of said aluminum powder is in the range of 1.0 to 10.0 μm.

6. A paint containing the aluminum flake pigment according to claim 1 and a binder.

7. Ink containing the aluminum flake pigment according to claim 1 and a binder.

8. The aluminum flake pigment of claim 1, wherein the aluminum flakes have an average value of minimum diameter/maximum diameter of 0.6 to 1.0.

* * * * *